US010656641B2

(12) United States Patent
Hasberg et al.

(10) Patent No.: US 10,656,641 B2
(45) Date of Patent: May 19, 2020

(54) METHOD AND SYSTEM FOR CONTROLLING A DRIVING FUNCTION OF A VEHICLE

(71) Applicant: Robert Bosch GmbH, Stuttgart (DE)

(72) Inventors: Carsten Hasberg, Ilsfeld-Auenstein (DE); Oliver Pink, Ditzingen (DE); Peter Sautter, Lauffen (DE); Sybille Eisele, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 243 days.

(21) Appl. No.: 15/570,792

(22) PCT Filed: May 10, 2016

(86) PCT No.: PCT/EP2016/060402
§ 371 (c)(1),
(2) Date: Oct. 31, 2017

(87) PCT Pub. No.: WO2016/184719
PCT Pub. Date: Nov. 24, 2016

(65) Prior Publication Data
US 2018/0120839 A1 May 3, 2018

(30) Foreign Application Priority Data
May 19, 2015 (DE) .......... 10 2015 209 137

(51) Int. Cl.
*G05D 1/00* (2006.01)
*B60W 50/029* (2012.01)
(Continued)

(52) U.S. Cl.
CPC ......... *G05D 1/0061* (2013.01); *B60W 50/029* (2013.01); *B60W 50/08* (2013.01);
(Continued)

(58) Field of Classification Search
CPC .............. B60W 50/029; B60W 50/10; B60W 2040/0863; B60W 2050/007;
(Continued)

(56) References Cited

U.S. PATENT DOCUMENTS 5,819,227 A * 10/1998 Obuchi .............. G01C 21/3423
705/13
9,298,184 B2 * 3/2016 Bartels ................. B60W 50/10
(Continued)

FOREIGN PATENT DOCUMENTS

CN 103693038 A 4/2014
EP 2314489 A1 4/2011
(Continued)

OTHER PUBLICATIONS

International Search Report dated Jul. 20, 2016, of the corresponding International Application PCT/EP2016/060402 filed May 10, 2016.

*Primary Examiner* — Nicholas Kiswanto
(74) *Attorney, Agent, or Firm* — Norton Rose Fulbright US LLP; Gerard Messina

(57) ABSTRACT

A method and a system for controlling a driving function of a vehicle, whereby in a first operating state, the driving function is controlled by a vehicle guidance system, and in a second operating state, the driving function is controlled by a command of a driver, a transition from the first operating state to the second operating state being accomplished with the aid of an orderly handover through a preset handover procedure when it is recognized that a predetermined first condition is fulfilled, or with the aid of a handover in a fallback solution when it is recognized that a predetermined second condition is fulfilled.

15 Claims, 2 Drawing Sheets

(51) Int. Cl.
  *B60W 50/10*   (2012.01)
  *B60W 50/08*   (2020.01)
  *B60W 50/14*   (2020.01)
  *B60W 40/08*   (2012.01)
  *B60W 50/02*   (2012.01)
  *B60W 50/00*   (2006.01)

(52) U.S. Cl.
  CPC ............ *B60W 50/10* (2013.01); *B60W 50/14* (2013.01); *B60W 2040/0863* (2013.01); *B60W 2050/007* (2013.01); *B60W 2050/0073* (2013.01); *B60W 2050/022* (2013.01); *B60W 2050/0215* (2013.01); *B60W 2050/0295* (2013.01); *B60W 2540/00* (2013.01); *B60W 2552/00* (2020.02); *B60W 2552/05* (2020.02); *B60W 2554/804* (2020.02); *B60W 2555/20* (2020.02); *B60W 2555/60* (2020.02); *B60W 2555/80* (2020.02); *B60W 2556/50* (2020.02); *G05D 2201/0213* (2013.01)

(58) Field of Classification Search
  CPC ..... B60W 2050/0215; B60W 2540/00; B60W 2550/12; B60W 2550/14; B60W 2550/16; B60W 2550/22; B60W 2550/302; G05D 1/0061; G05D 2201/0213
  See application file for complete search history.

(56) References Cited

U.S. PATENT DOCUMENTS

| | | | |
|---|---|---|---|
| 9,586,585 B2* | 3/2017 | Delp | B60W 30/181 |
| 9,694,681 B2* | 7/2017 | Kleen | B60W 50/14 |
| 9,845,096 B2* | 12/2017 | Urano | G05D 1/0061 |
| 9,896,096 B2* | 2/2018 | Newman | B60W 50/16 |
| 9,910,435 B2* | 3/2018 | Sato | B60W 50/082 |
| 10,227,073 B2* | 3/2019 | Urano | B62D 1/286 |
| 2013/0211656 A1 | 8/2013 | An et al. | |
| 2014/0018993 A1 | 1/2014 | Kindo et al. | |
| 2014/0303827 A1 | 10/2014 | Dolgov et al. | |
| 2018/0157256 A1* | 6/2018 | Oniwa | B60W 50/14 |

FOREIGN PATENT DOCUMENTS

| | | |
|---|---|---|
| EP | 2314490 A1 | 4/2011 |
| JP | 2007196809 A | 8/2007 |

* cited by examiner

METHOD AND SYSTEM FOR CONTROLLING A DRIVING FUNCTION OF A VEHICLE

FIELD

The present invention relates to a method for controlling a driving function of a vehicle, and a system for carrying out the method.

BACKGROUND INFORMATION

In the related art, various driver assistance systems are described, that is, systems in a motor vehicle that assist the driver in guiding the motor vehicle. The best-known driver assistance systems already on the market for a long time are the ABS system and the ESP system. The ABS system supports the driver during a full braking in order to prevent the wheels from locking, while the ESP system counteracts skidding of the vehicle within the stability limit. With newer driver assistance systems, for example, automatic parking with the aid of a so-called parking assist is made possible for the driver. These newer driver assistance systems continue to be developed, and as of now, have already arrived at what is referred to as an ACC (adaptive cruise control) system which, for instance, permits the driver to drive behind preceding vehicles with adapted speed. Further systems include a warning in the event the vehicle inadvertently leaves the traffic lane (lane-assist system), and countersteering to a certain extent. Emergency braking systems are also already widespread, which in dangerous situations, initiate an emergency braking under predetermined maximum deceleration, even without the assistance of the driver. These systems are referred to as semi-autonomous systems.

Further developments in the direction of highly automated or fully automated vehicle guidance systems in which, within the defined system limits, the driver is able to transfer responsibility for the vehicle guidance to the vehicle guidance system are being pursued.

SUMMARY

An object of the present invention is to provide a system and a method for controlling a driving function of a vehicle. The object of the present invention may be achieved by the example methods and systems described herein.

Specific example embodiments of the present invention are described herein.

An advantage of the example method and the example system is the provision of a safe and reliable handover of the driving responsibility from the driver to the vehicle guidance system, and from the vehicle guidance system to the driver.

In one specific embodiment, a method is provided for controlling a driving function of a vehicle, whereby in a first operating state, the driving function is controlled by a vehicle guidance system, in a second operating state, the driving function is controlled by a command of a driver, and a transition from the first operating state to the second operating state is accomplished with the aid of an orderly handover through a preset handover procedure when it is recognized that a predetermined first condition is fulfilled, or with the aid of a handover in a fallback solution when it is recognized that a predetermined second condition is fulfilled.

In a further specific embodiment, a method is provided for controlling a driving function of a vehicle, whereby in a first operating state, the driving function is controlled by a vehicle guidance system, in a second operating state, the driving function is controlled by a command of a driver, where during a first operating state, in response to the presence of a third system state, the control of the driving function is replaced by a driver command, in particular, the driver command being effected by an intuitive input. A transition from the second operating state to the first operating state takes place when an input for a change from the second operating state to the first operating state is implemented.

An advantage of this method is that the driving responsibility is handed over safely and reliably.

In one specific embodiment, the first condition is satisfied when the vehicle is in a predetermined first operating range, and when the vehicle guidance system is in a predetermined first system state.

In one specific embodiment, the second condition is satisfied when the vehicle is in a predetermined second operating range, and when the vehicle guidance system is in a predetermined second system state.

The advantage of the specification of operating ranges for the vehicle and system states of the vehicle guidance system for assessing the manner in which the handover should take place is that clearly defined values or value ranges are specified, according to which the handover is to be carried out.

In one embodiment, the first, the second and/or the third operating range of the vehicle is/are a function of at least one defined system limit, especially a specified road section, a national border, a predetermined speed range, a predetermined speed differential with respect to other vehicles, a predetermined traffic situation, a trajectory of the vehicle, a predetermined weather condition and/or a predetermined road condition.

In a further embodiment, a first and/or second and/or third system state of the vehicle guidance system depends on a function of a sensor system and/or actuator system and/or at least one functional part of the vehicle guidance system and/or an overload of the vehicle guidance system.

The definition of the operating range and the system states as system errors and system overload is advantageous in order to permit a correct decision concerning the handover of the driving responsibility either to the driver or to the vehicle guidance system.

In a further embodiment, prior to the handover procedure in the case of the orderly handover, a takeover request is made by the vehicle guidance system to the driver. In particular, the driver is to indicate the take-back of the driving responsibility to the vehicle guidance system by an input. This embodiment permits a safe and conscious transfer of the driving responsibility to the driver.

In a further embodiment, prior to a complete transfer of the driving responsibility to the driver, the handover procedure checks, especially for a predefined period of time, whether a predetermined driving behavior of the driver is present, and if the predetermined driving behavior is recognized, the driving responsibility is handed over to the driver, and if the predetermined driving behavior of the driver is not recognized, the driving responsibility of the driver is at least partially restricted.

Preferably, in the event the predetermined driving behavior of the driver is not recognized, a command by the driver is at least partially ignored, and the vehicle is controlled at least in part by the vehicle guidance system. This has the advantage that the system is able to intervene if the driver is not ready to assume the driving responsibility.

In a further embodiment, in response to the presence of a predetermined system state of the vehicle guidance system, particularly in the case of an overload of the vehicle guidance system, a driver command replaces a control by the vehicle guidance system for controlling the vehicle. This has the advantage that in extreme situations, the driver is able to have the possibility of an intuitive intervention and therefore an overruling of the vehicle guidance system, thus increasing the safety. The driving responsibility remains with the vehicle guidance system for the duration of the intuitive intervention. Only after the intuitive intervention has ended and the vehicle guidance system continues to be overloaded, does the driver-guidance system request the driver to take over the driving responsibility, preferably according to the orderly handover.

In a further embodiment, the vehicle guidance system indicates the status in which it finds itself to the driver. This enables the driver to always have an overview of the instantaneous status of the vehicle guidance system, that is, who is responsible for the driving at the moment.

In addition, a system is provided which is equipped to carry out the method according to the present invention.

BRIEF DESCRIPTION OF THE DRAWINGS

The present invention is described in greater detail with reference to the figures.

DETAILED DESCRIPTION OF EXAMPLE EMBODIMENTS

Figure 1:
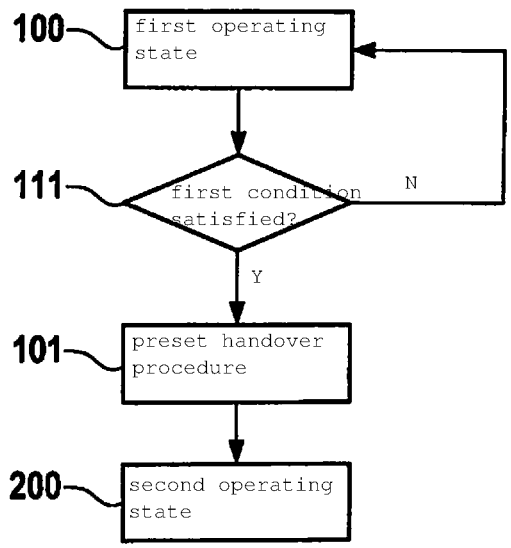
FIG. 1 shows a schematic representation of an orderly handover of a driving responsibility to the driver.
Figure 2:
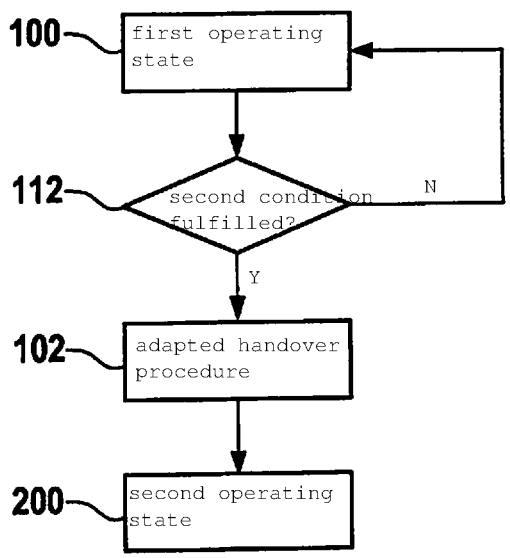
FIG. 2 shows a schematic representation of a handover in a fallback solution.

FIGS. 1 and 2 show specific embodiments of a method in accordance with the present invention for controlling a driving function of a vehicle, especially the control of a handover of the driving responsibility from a vehicle guidance system to a driver. By driving responsibility is meant that the driving function is controlled either by the driver command or by the vehicle guidance system. The driving function may be the steering of the vehicle and/or the acceleration of the vehicle and/or the braking of the vehicle. The driver command may be an acceleration and/or braking and/or steering of the vehicle. A transition from a first operating state 100 in which the driving function is controlled by the vehicle guidance system, thus, the driving responsibility lies with the vehicle guidance system, to a second operating state 200 in which the driving function is controlled by a driver command, thus, the driving responsibility lies with the driver, may be accomplished, for example, in the two following ways.

One type of transition from first operating state 100 to second operating state 200 may be implemented by an orderly handover. Here, the driving responsibility is transferred to the driver with the aid of a preset handover procedure 101 if a predetermined first condition 111 is satisfied. This is shown in FIG. 1.

Alternatively, a handover of the driving responsibility to the driver in the fallback solution may take place when a predetermined second condition 112 is fulfilled, which may also be referred to as degraded deactivation. The handover procedure in the fallback solution may differ from the handover procedure in the orderly handover, depending on which system parts have failed. To that end, suitable handover procedures and semi-autonomous driving functions are stored. FIG. 2 shows schematically a handover in a fallback solution.

An orderly handover, as shown in FIG. 1, may take place when certain boundary conditions are satisfied for first condition 111. A takeover as shown in FIG. 2 may take place when certain necessary boundary conditions, different than for an orderly handover, are satisfied for second condition 112. The boundary conditions are, on one hand, that the vehicle is in a predetermined operating range, and/or that the vehicle guidance system is in a predetermined system state. If the conditions are not met, the driving responsibility is not handed over.

Operating Range

An operating range of the vehicle is a function of at least one predetermined limit. Limits are defined by values or value ranges, depending on the type of limit. So long as the vehicle is within the predetermined limit or limits, autonomous driving may take place. Should the vehicle exceed a limit or approach it up to a specific predefined pre-limit, the driving responsibility is transferred from the vehicle guidance system to the driver. This may be accomplished with the aid of the orderly handover and a handover procedure 101 if the system is in a predefined first system state, or with the aid of degraded deactivation with an adapted handover procedure 102 depending on the type and extent of the failure of system components or system functional parts, if the system is in a defined second system state.

As limits for the first operating range, any predetermined limits may be defined which are permitted for semi-autonomous driving or autonomous driving by the vehicle guidance system. For example, this may be a specified road or a specified road section for which autonomous driving is allowed. These may include turnpikes or turnpike sections, highways or certain sections thereof, as well as private property. In addition, predetermined road conditions, an allowed speed range, an allowed speed differential with respect to a possibly preceding vehicle or certain weather conditions may be used as limits. The list is not final. Rather, the predefined limits may always be further expanded by legislative changes as well as technical improvements.

In the following, examples are cited as to what a possible limit may be and how the system may be configured. For instance, a limit may be a geographical or political boundary, especially a national border.

That is, the vehicle is moving within the limits so long as it is located within the German national borders, for example. As soon as the vehicle approaches a national border, it is determined that the driving responsibility must be transferred from the vehicle guidance system to the driver, and a handover of the driving responsibility is initiated. To that end, the vehicle changes from first operating state 100 to second operating state 200, in which the driver assumes the responsibility. The assessment as to the point at which the vehicle has come close enough to the national border is a function of stored values which, for instance, are given by statutory provisions, as well as values preset by the manufacturer.

For example, a handover may be initiated when the vehicle is on a turnpike 5 kilometers from a geographical and/or political boundary, especially a national border, and it is no longer possible to exit. The same scheme may be used for driving on a turnpike or highway when the vehicle reaches a certain distance from construction sites or other roads or road sections not approved.

Furthermore, a limit may be a predetermined speed, as of which autonomous driving is no longer allowed. This may result from statutory provisions, or from safety-related considerations. In this context, for example, a visual range of a driving-environment sensor system employed may influence or determine the limit. For instance, 200 km/h may be defined as a speed limit, since starting from this speed, increased attentiveness of the driver is needed or autonomous driving is not allowed. In addition, a minimum distance from or a maximum speed differential with respect to the preceding vehicle or to vehicles driving in adjacent lanes may be required in order to ensure safe autonomous driving. Furthermore, certain predetermined traffic situations, what are referred to as use cases, such as bumper-to-bumper traffic and vehicles that are passing, swinging in or swinging out may be defined for the determination of limits. In addition, interactions of different individual limits in combination may be considered.

There are various possibilities for predefining limits for the vehicle. One possibility is to evaluate certain limits such as weather conditions or road conditions by sensors, to compare the results with a predetermined value range, and to assess whether or not the limits are fulfilled. Another possibility is to import data into the system with the aid of the Internet or other connection methods, and then evaluate it. Limits such as national borders, for example, may also already be stored in the system and utilized for the assessment. A combination of different methods is possible, as well.

System State

To hand over the driving responsibility, not only is the operating range of the vehicle important for assessing which handover should be carried out, but also the system state should be evaluated. To hand over the driving responsibility, the vehicle, especially the vehicle guidance system, should also be in a predefined system state. For example, a predetermined second system state indicates whether an error, especially a system error, was detected by the vehicle guidance system. In addition, a further system state may indicate whether the vehicle guidance system is overloaded.

For instance, system errors are a failure in the sensor system, actuator system or functional parts, which could adversely affect a handover of the driving responsibility. For example, a failure of the sensor system may be when it has been recognized that a sensor or a camera for detecting the preceding traffic has failed or is in an undefined state. A failure of or damage to the actuators, such as the steering system or the brake, may also be a reason not to hand over the driving responsibility, but rather to initiate discrete measures to ensure safe driving. A failure of other functional parts may be the failure of an input means such as a knob, for instance, by which the driver indicates to the vehicle guidance system an input for confirming the takeover of the driving responsibility. For an assessment as to whether system errors are present, findings from the driving environment of the vehicle may be utilized, such as data which was acquired with the aid of radar, video, lidar, ultrasound or other measuring means, for example. Moreover, data from inertial sensors may be evaluated like, for instance, ego accelerations, thus, an inherent acceleration of the vehicle, an ego velocity, thus, an initial velocity of the vehicle, and yaw rate(s), roll rate(s) or pitch rate(s) may be utilized. Furthermore, data from map material and/or GPS (Global Positioning System) or a comparison with an evaluation of driving-environment data may also be employed for the assessment of errors. The operational capability of the sensor system, the actuator system or functional parts thereof may be checked by the vehicle guidance system itself or by a further arithmetic logic unit. In addition, the operational capability of the vehicle guidance system may be checked by the further arithmetic logic unit.

An overload of the system is a further third system state that may be utilized to assess whether an intuitive overruling by the driver is allowed. Conditions which may signify or give rise to an overload of the system may, for example, be certain weather situations such as black ice or aquaplaning. Such conditions may both be measured by sensors on the vehicle, and reported to the vehicle by way of the Internet or other data-transmission methods, depending on how the vehicle is equipped. Further criteria for an overload of the vehicle are, for example, the detection or report of a wrong-way driver or the recognition that a collision-free trajectory is no longer available for the guidance of the vehicle if, for instance, other road users do not behave in conformity with the rules. For instance, the system is also classified as overloaded if, with the maximum predetermined braking decelerations and/or maximum predetermined steering interventions, there is no avoidance trajectory to be followed. In the case of a recognized system overload, the driver has the possibility of intuitively overruling the vehicle guidance system.

Orderly Handover

An orderly handover of the driving responsibility from the vehicle guidance system to a driver is initiated and carried out with the aid of a handover procedure when a predetermined first condition is fulfilled. If the first condition is not fulfilled, but a second condition is fulfilled, a degraded deactivation with adapted handover procedure is carried out, as described below. Hereinafter is a description of how the first condition may be defined.

As first condition, it may be assumed that the vehicle is both in a predetermined first operating range, thus, preset limits are being observed, and a predetermined first system state is present. The first operating range is fulfilled, for example, when the vehicle is within predetermined limits but, for instance, is approaching certain limits to a predetermined value, as described above. The first system state is fulfilled, for example, when no errors have been detected in the system that could adversely affect a handover of the driving responsibility, that is, would make autonomous driving unsafe, and when there is no excessive demand on the system. For example, system errors like a failure to detect the speed of the preceding vehicle or a failure of an input knob may make autonomous driving unsafe, as described above. Furthermore, an overload may exist if black ice has been detected on the road, as described above. If these boundary conditions are satisfied, the driving responsibility is transferred through an orderly handover and a handover procedure, as described hereinafter and illustrated in FIG. 1. The handover of the driving responsibility to the driver also means that the driving function is determined by the command of the driver, and not by the vehicle guidance system.

The final handover of the driving responsibility is accomplished with the aid of a handover procedure. In so doing, for example, it is checked whether the driver is in a state in which he is able to assume the driving responsibility. In one simple embodiment, the vehicle guidance system prompts the driver to confirm by an input that he is ready to take on the driving responsibility. The input may be effected by a haptic input such as pressing a button or touching a touch display or by speech input. Alternatively, any means may be used that is suitable for the input of a confirmation. Preferably, it is also checked whether the driver is in a focused state, so that he consciously assumes the driving responsibility. This check may be accomplished in various ways. For example, sensors are able to detect whether the driver has his hands on the steering wheel or feet on the pedals or, with the aid of a camera and associated analysis, it is possible to detect whether the driver is attentive and/or whether or not he is looking at the road. In addition, after the take-back input indicated by the driver, the vehicle guidance system may monitor over a predetermined period of time so as to check the driving behavior and to assess whether the behavior lies within predetermined conditions. One condition indicating that the behavior conforms to a predetermined behavior may be that within the first 2 seconds after assuming the driving responsibility, the driver performs no predetermined braking, especially no full braking, that is, does not press the brake pedal up to a predetermined extent, if the vehicle guidance system did not detect any danger situation prior to and during the handover procedure.

Should the vehicle guidance system or the further arithmetic logic unit detect that the behavior of the driver is not within a predetermined range, especially in a predetermined steering range and/or acceleration range, no handover to the driver takes place. Rather, the vehicle guidance system retains control over the driving function and the driving responsibility, at least to the degree that the safety of the driving is not impaired, thus, no overload of the system is detected.

For the assessment as to whether the predetermined criteria are satisfied, that is, for the data necessary for the individual check systems, data may be read in from the driving-environment sensor system of the vehicle, other functional parts such as driving-environment perception may be evaluated, sensors and functional parts from a vehicle and motion management system may be read in and evaluated, map material may be read in and evaluated, and further states such as an intentional take-back command of the driver may be assessed. Preferably, after the takeover of the driving responsibility, the vehicle guidance system indicates to the driver, preferentially via an interface such as a display, that the driving responsibility now lies with the driver.

Handover in the Fallback Solution

FIG. 2 shows a handover of the driving responsibility from the vehicle guidance system to the driver in the fallback solution. For a handover in the fallback solution, a prerequisite is that it is recognized that a second condition, which differs from the first condition for the orderly handover, is fulfilled.

For a handover in the fallback solution, preferably the vehicle must both be in a predetermined second operating range, thus, must observe predetermined limits, and must exhibit a predetermined second system state. Here, the predetermined second operating range is either the same operating range as for an orderly handover, that is, is identical to the first operating range, or the second operating range defines different limiting values than the first operating range. This definition may be a function of the recognized system state, and may include a wider or narrower range than the range for the first operating range. A handover in the fallback solution, also referred to as degraded deactivation, is carried out when in addition, a second system state has been recognized, thus, a system error has been detected. A failure of the sensor system, the actuator system and/or other functional parts may be defined as system error, as described above. The degraded deactivation may be a function of the types of error detected; for example, if the interface for confirming the take-back was detected as faulty, this cannot be evaluated in the degraded deactivation. For the handover in the fallback solution, a specific procedure for the handover may be stored in which, for example, immediately at least one partial function of the driving function is restricted, without the handover for the driving responsibility to the driver being concluded. In addition, individual functions of the driving function may also be transferred immediately to the responsibility of the driver, that is, the individual functions are immediately controlled by suitable driver commands. Moreover, an emergency-operation program may also be stored as degraded deactivation.

Possibility of Intuitive Overruling by the Driver

Figure 3:
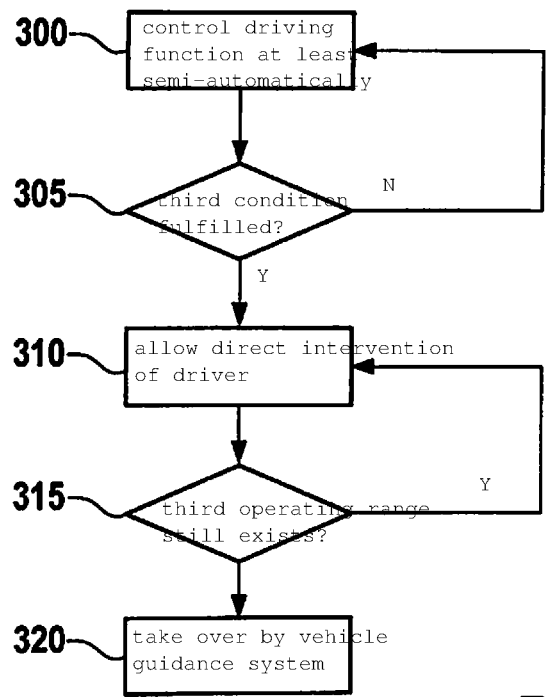
FIG. 3 shows a schematic representation of an intuitive overruling by the driver.

FIG. 3 shows the possibility of the intuitive overruling of the control of the driving function by the driver. At program point 300, at least one driving function of the vehicle, especially the steering and/or the speed of the vehicle, is controlled at least semi-autonomously or fully autonomously by the vehicle guidance system. In so doing, the vehicle guidance system may execute the driving function at least partially autonomously, especially highly autonomously.

Subsequently, at program point 305, the check is made as to whether a predetermined third condition is fulfilled. For example, the predetermined third condition is fulfilled when the vehicle is in a third operating range or the vehicle guidance system is in a predetermined third system state. The third system state is stored in a memory, for instance. The third system state may be an overload of the vehicle guidance system. An overload of the vehicle guidance system occurs, for example, upon recognition of an aquaplaning situation of the vehicle, or upon detection of black ice on the roadway of the vehicle. A further criterion for an overload of the vehicle guidance system may be the recognition that there is no longer a collision-free trajectory available for the guidance of the vehicle if, for example, other road users do not behave in conformity with the rules. The check at program point 305 may be carried out by the vehicle guidance system or by a further arithmetic logic unit that is connected to the vehicle guidance system. For instance, a detection of aquaplaning or black ice may be defined as system overload, as described above. In this case, no handover procedure is carried out, but rather the driver overrules the vehicle guidance system, mostly by intuitive action. Such an (intuitive) overruling may take place when the vehicle guidance system assumes a system state in which an overload is recognized.

If the presence of the third system state is recognized, the program branches to program point 310. If the third system state is not detected, then the program branches back to program point 300, and the check at program point 305 is carried out again after a fixed length of time.

Depending on the selected implementation, or instead of the presence of the third system state, it may also be checked at program point 305 whether the vehicle is in a predetermined third operating range.

At program point 310, the vehicle guidance system allows a direct intervention of the driver in the driving function performed by the vehicle guidance system. Thus, in response to the recognition of a driver command, the driving function is controlled by the driver command. In such a situation, by overruling, the driver is able to take over the control of the vehicle at program point 310 without a handover procedure, which costs time. In other words, the vehicle guidance system demands no confirmation with handover procedure and, for example, supervision of the driving behavior of the driver for a certain time. This may happen in situations such as black ice, aquaplaning, a recognized wrong-way driver, or when there is no longer a collision-free trajectory available for the vehicle if, for instance, other road users do not behave in conformance with the rules, which may be defined as third system state.

After the driver has assumed the control by an intuitive intervention, it must be clear if the vehicle guidance system again takes over the control.

At a following program point 315, it is checked whether the third system state and/or the third operating range continue to exist. If the third system state and/or the third operating range continue to exist, then the program branches back to program point 310, and the control of the driving function is determined by the driver command.

If the check at program point 315 reveals that the third system state and/or the third operating range no longer exist, then the program branches to program point 320. At program point 320, the execution of the driving function may again be taken over by the vehicle guidance system.

In a further refinement, as soon as the condition of the system overload is no longer fulfilled, the vehicle guidance system may remain responsible for the vehicle guidance, that is, the driving function is controlled at least partially autonomously or fully autonomously by the vehicle guidance system, or an orderly handover to the driver is carried out. In any case, after an intuitive intervention, the driver is also informed by the vehicle guidance system via the interface as to who is responsible for the driving, that is, whether the driver with his driver command or the vehicle guidance system controls the driving function.

Handover of Driving Responsibility to the Vehicle Guidance System

Figure 4:
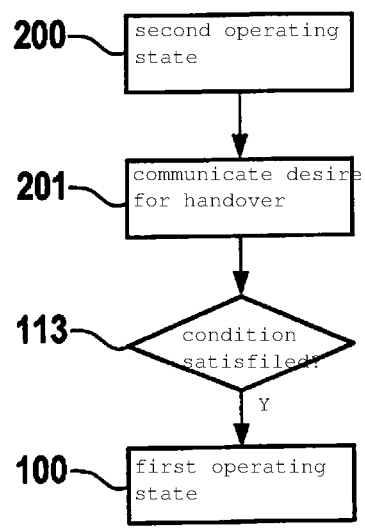
FIG. 4 shows a schematic representation of a handover of the driving responsibility to the vehicle guidance system.

FIG. 4 shows a further exemplary embodiment of the method for controlling a driving function of a vehicle, more specifically, the control of a handover of the driving responsibility from a driver to a vehicle guidance system. Like for the handover of the driving responsibility to the driver, a condition 113 must be satisfied in the case of the handover to the vehicle guidance system. Condition 113 is made up of the evaluation of the operating state and the system state in this method, as well. In addition, a further condition is that an input 201 is effected by the driver, by which a desire to change from an operating state 200 to the other operating state 100 is indicated to the system.

The driver is able to communicate in various ways to the vehicle guidance system, his desire for the handover of the driving responsibility, preferably via an input 201 by way of an interface in the vehicle. For example, a knob or switch may be present in the vehicle, e.g., on the steering wheel. An interface like a display may also be located in the vehicle, which is controlled by touching it. An acoustic input by the driver is possible, as well. Moreover, the vehicle may additionally implement a confirmation query for the activation in order, on one hand, to be on the safe side that the input did not happen unintentionally, and on the other hand, to prevent unauthorized driving by a person not fit to drive, for example.

Such an inquiry may likewise be accomplished by way of a knob, switch, by touching a display or by a preset sequence of actions. Such actions may be preset by the driver or by the vehicle guidance system and, for example, may be a pressing of the gas pedal, followed by an input on the display of the vehicle or other combinations. The driving responsibility is taken over by the vehicle guidance system when the operating state of the vehicle allows autonomous driving, thus, when the vehicle is within predefined limits. In addition, it is necessary that the system state of the vehicle be error-free, thus, for example, that the sensor system and actuator system are free of defects, as described above. If these conditions are met, the vehicle guidance system assumes the driving responsibility and indicates this to the driver, preferably via an interface. If the conditions are not met, the driving responsibility is not handed over.

The check of the operating state and the system state may be realized as function, preferably in software, but parts thereof may be provided as hardware, depending upon which vehicle is to be equipped with it and what criteria must be fulfilled.

Furthermore, a vehicle is equipped with a system that is able to carry out the checks and evaluations indicated above. To that end, in addition to the vehicle guidance system, a further arithmetic logic unit, a data memory, a suitable sensor system and a suitable actuator system may be provided.

An advantage of the method and system according to the present invention is that driving responsibility may be handed over from the driver to the vehicle guidance system and from the vehicle guidance system to the driver based on predetermined boundary conditions, in doing which, systems already available in the vehicle, like cameras, driver-monitoring systems, error-monitoring systems, etc., may be used for this purpose. Moreover, a method is provided that is able to flexibly implement regulations for autonomous driving, and at the same time, permit a safe handover.

The vehicle guidance system may carry out assisted driving, in which the driver is always responsible for guiding the vehicle. In addition, the vehicle guidance system may carry out partially automated or fully automated driving, in which the driver is responsible at times or not at all for the vehicle guidance.

What is claimed is:

1. A method for controlling a driving function of a vehicle, the method comprising:
controlling, in a first operating state, the driving function by a vehicle guidance system; and
controlling, in a second operating state, the driving function by a command of a driver;
wherein a transition from the first operating state to the second operating state is accomplished with an orderly handover through a preset handover procedure when it is recognized that a predetermined first condition is fulfilled, and with a handover in a fallback solution when it is recognized that a predetermined second condition is fulfilled,
wherein the predetermined first condition is satisfied when the vehicle is in a predetermined first operating range, and when the vehicle guidance system is in a predetermined first system state, and wherein the predetermined first system state is fulfilled when no errors have been detected in the vehicle guidance system that adversely affect a handover of driving responsibility, and
wherein the predetermined second condition is satisfied when the vehicle is in a predetermined second operating range, and when the vehicle guidance system is in a predetermined second system state, and wherein the second system state indicates an error is detected by the vehicle guidance system, and
wherein the predetermined first operating range differs from the predetermined second operating range.

2. The method as recited in claim 1, wherein a transition from the second operating state to the first operating state ensues when an input for a change from the second operating state to the first operating state takes place and a further condition is satisfied.

3. The method as recited in claim 1, wherein at least one of the first, the second, and a third operating range is a function of at least one defined limit, the at least one predefined limit including at least one of: a specified road section, a national border, a predetermined speed range, a predetermined speed differential with respect to other vehicles, a predetermined traffic situation, a trajectory of the vehicle, a predetermined weather condition, and a predetermined road condition.

4. The method as recited in claim 1, wherein at least one of a first system state and a second system state is a function of a failure of at least one of: a sensor system, an actuator system, and at least one functional part of the vehicle guidance system, and wherein the third system state includes an overload of the vehicle guidance system.

5. The method as recited in claim 1, wherein prior to the handover procedure in the case of the orderly handover, a takeover request is made by a vehicle guidance system to the driver, and the driver indicating a take-back of driving responsibility to the vehicle guidance system by an input.

6. The method as recited in claim 1, wherein prior to a complete transfer of driving responsibility to the driver, the handover procedure checks for a predefined period of time, whether a predetermined driving behavior of the driver is present, and if the predetermined driving behavior is recognized, the driving responsibility is handed over to the driver, and if the predetermined driving behavior of the driver is not recognized, the driving responsibility of the driver is at least partially restricted.

7. The method as recited in claim 6, wherein if the predetermined driving behavior of the driver is not recognized, a command by the driver is at least partially ignored, and the vehicle is controlled at least in part by the vehicle guidance system.

8. The method as recited in claim 1, wherein in response to the presence of a third condition, a driver command, in the form of an intervention, replaces a control by the vehicle guidance system and is used to control the vehicle.

9. The method as recited in claim 8, wherein the third condition is an overload of the vehicle guidance system.

10. The method as recited in claim 8, wherein the third condition includes at least one of a third operating state of the vehicle and a third system state of the vehicle guidance system.

11. A method for controlling a driving function of a vehicle, the method comprising:
controlling, in a first operating state, the driving function by a vehicle guidance system;
controlling, in a second operating state, the driving function by a command of a driver; and
replacing, in response to the presence of a predetermined third system state of the vehicle guidance system, a driver command, in the form of an intervention, a control by the vehicle guidance system and which is used to control the vehicle;
wherein a predetermined first condition is satisfied when the vehicle is in a predetermined first operating range, and when the vehicle guidance system is in a predetermined first system state, and wherein the predetermined first system state is fulfilled when no errors have been detected in the vehicle guidance system that adversely affect a handover of driving responsibility, and
wherein a predetermined second condition is satisfied when the vehicle is in a predetermined second operating range, and when the vehicle guidance system is in a predetermined second system state, and wherein the predetermined second system state indicates an error is detected by the vehicle guidance system, and
wherein the predetermined first operating range differs from the predetermined second operating range.

12. The method as recited in claim 11, wherein the predetermined third system state is the vehicle guidance system being overloaded.

13. The method as recited in claim 11, wherein for a duration of an intervention by a driver, a driving responsibility remains with the vehicle guidance system, and only after a predetermined duration of the intervention by the driver, after the intervention has ended and in response to a further existing overload of the vehicle guidance system, is a request made by the vehicle guidance system to the driver to take over the driving responsibility.

14. The method as recited in claim 11, wherein the vehicle guidance system indicates the status in which it finds itself to the driver.

15. An apparatus for controlling a driving function of a vehicle, comprising:
a system configured to perform the following:
controlling, in a first operating state, the driving function by a vehicle guidance system; and
controlling, in a second operating state, the driving function by a command of a driver;
wherein a transition from the first operating state to the second operating state is accomplished with an orderly handover through a preset handover procedure when it is recognized that a predetermined first condition is fulfilled, and with a handover in a fallback solution when it is recognized that a predetermined second condition is fulfilled,
wherein the predetermined first condition is satisfied when the vehicle is in a predetermined first operating range, and when the vehicle guidance system is in a predetermined first system state, and wherein the predetermined first system state is fulfilled when no errors have been detected in the vehicle guidance system that adversely affect a handover of driving responsibility, and
wherein the predetermined second condition is satisfied when the vehicle is in a predetermined second operating range, and when the vehicle guidance system is in a predetermined second system state, and wherein the predetermined second system state indicates an error is detected by the vehicle guidance system, and
wherein the predetermined first operating range differs from the predetermined second operating range.

* * * * *